United States Patent Office 3,102,809

Patented Sept. 3, 1963

3,102,809

NAPHTHOQUINONE-(1,2)-DIOZIDES AND PRINTING PLATES MADE THEREWITH

Fritz Endermann, Wiesbaden, Fritz Uhlig, Weisbaden-Biebrich, and Paul Stahlhofen, Wiesbaden, Germany, assignors, by mesne assignments, to Azoplate Corporation, Murray Hill, N.J., a corporation of New Jersey No Drawing. Filed July 21, 1960, Ser. No. 44,254
Claims priority, application Germany Aug. 5, 1959
47 Claims. (Cl. 96—33)

Printing plates provided with a reproduction coating containing various naphthoquinone-(1,2)-diazide sulfonic acid esters, as light-sensitive compounds, are known to the art.

Reproduction coatings, in particular for printing plates, have now been found which are characterized by a content of at least one light-sensitive ester, containing at least one free hydroxyl group, of a naphthoquinone-(1,2)-diazide sulfonic acid with an anthraquinone derivative, which is substituted by at least two hydroxyl groups and which additionally may contain nitro groups, halogen and/or alkyl and/or alkoxy radicals and which also may contain alkali-soluble resins.

Exemplary of the compounds which may be used in accordance with the present invention are:

FORMULA 1

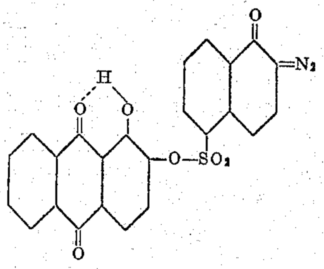

FORMULA 2

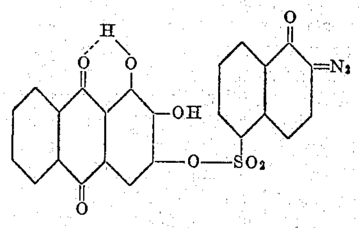

FORMULA 3

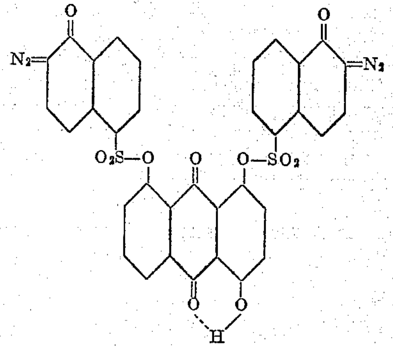

FORMULA 4

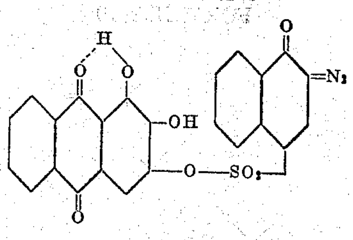

FORMULA 5

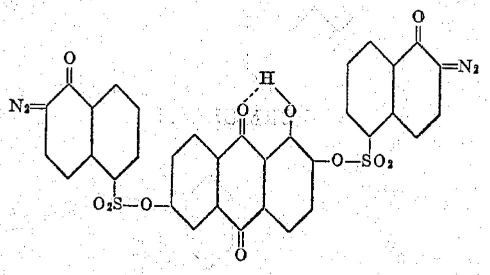

FORMULA 6

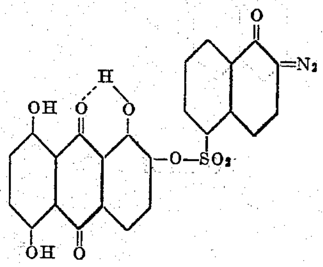

FORMULA 7

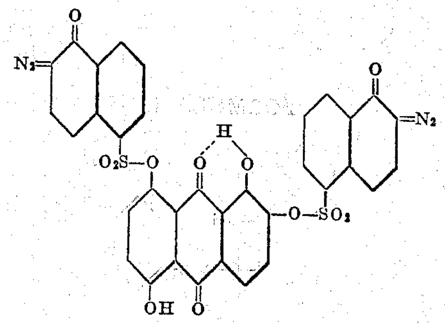

FORMULA 8

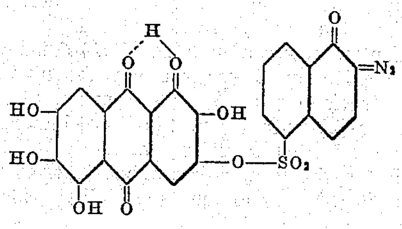

FORMULA 9

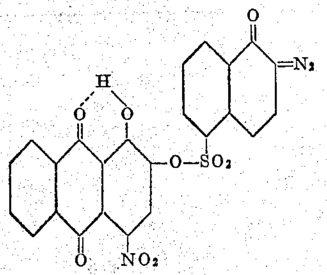

FORMULA 10

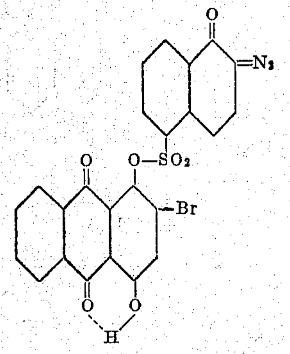

FORMULA 11

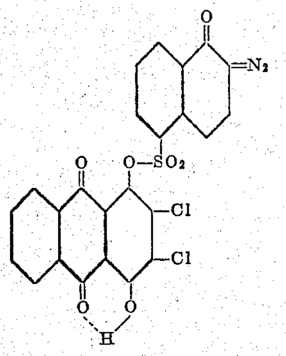

FORMULA 12

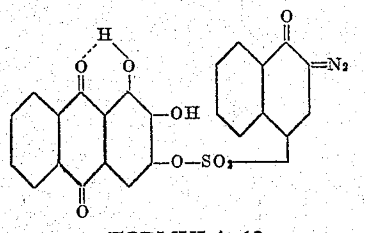

FORMULA 13

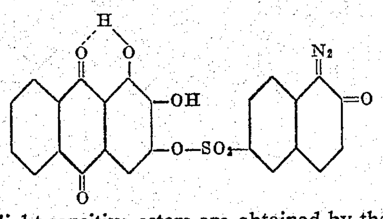

These light-sensitive esters are obtained by the reaction of, for example, the sulfonic acid chlorides of naphthoqinone-(1,2)-diazide sulfonic acids with derivatives of anthraquinone containing at least two hydroxyl groups.

In particular, the naphthoquinone-(1,2)-diazide sulfonic acid esters which are derived from naphthoquinone-(1,2)-diazide-(2)-sulfonic acid-(5) and from naphthoquinone-(1,2)-diazide-(2)-sulfonic acid-(4) are of interest. However, esters of other naphthoquinone-(1,2)-diazide sulfonic acids, such as naphthoquinone-(1,2)-diazide-(1)-sulfonic acid-(5), naphthoquinone-(1,2)-diazide-(1)-sulfonic acid-(4), naphthoquinone-(1,2)-diazide-(1)-sulfonic acid-(6) or naphthoquinone-(1,2)-diazide-(1)-sulfonic acid-(7) may also be used.

The following are exemplary of anthraquinone derivatives which are substituted by at least two hydroxyl groups and which may also contain nitro groups, halogens, such as fluorine, bromine and iodine, but particularly chlorine, and/or lower alkyl radicals such as methyl, ethyl, propyl and butyl and/or lower alkoxy radicals such as methoxy, ethoxy, propoxy, and butoxy: 1,2-dihydroxy-anthraquinone, 2,3 - dihydroxyanthraquinone, 1,4 - dihydroxyanthraquinone, 1,8 - dihydroxyanthraquinone, 2,6-dihydroxyanthraquinone, 1,2,3-trihydroxyanthraquinone, 1,2,4 - trihydroxyanthraquinone, 1,5,8 - trihydroxyanthraquinone, 1,2,5 - trihydroxyanthraquinone, 1,2,6-trihydroxyanthraquinone, 1,4,8-trihydroxyanthraquinone, 1,2,7-trihydroxyanthraquinone, 1,2,4,8-tetrahydroxyanthraquinone, 1,2,5,8 - tetrahydroxyanthraquinone, 1,2,3,5,6,7-hexahydroxyanthraquinone, 1,2,4,5,6,8-hexahydroxyanthraquinone, 4-nitro-1,4-dihydroxyanthraquinone, 2,3-dichloro-1,4-dihydroxyanthraquinone, 2-bromo-1,4-dihydroxyanthraquinone, 4,8 - dinitro-1,5-dihydroxyanthraquinone, 1,2 - dihydroxy-3-methoxyanthraquinone, 1,3-dihydroxy - 2 - ethoxyanthraquinone, 2,4-dihydroxy-1-methylanthraquinone, 5,7 - dihydroxy-1-methylanthraquinone, and 1,5-dihydroxy-2,6-dimethylanthraquinone.

Those preferred are the di- and tri-hydroxyanthraquinones and substitution products thereof.

For the preparation of the esters, the two components, the sulfonic acids, usually in the form of sulfonic acid chlorides, are generally dissolved in a solvent such as dioxane or tetrahydrofuran and esterified by the addition of an acid binding agent such as alkali bicarbonates or alkali carbonates or other weak alkalis. Only sufficient acid binding agent should be added to ensure that dyestuff formation does not occur; the reaction mixture should thus always be neutral or weakly alkaline. The reaction product is isolated from the reaction mixture by precipitation with dilute hydrochloric acid, after which it is filtered off and dried. The sulfonic acid esters thus obtained are generally ready for immediate use in the preparation of the light-sensitive reprodutcion coatings. They may, however, be reprecipitated with water from solution in a suitable solvent, e.g., dioxane, and thus purified. One or more hydroxyl groups can be esterified as desired by adjustment of the quantity of acid binding agent with respect to the quantities of naphthoquinone-(1,2)-diazide sulfonic acid chlorides used.

For the preparation of the reproduction coatings, the naphthoquinone-(1,2)-diazide sulfonic acid esters containing hydroxyl groups are coated upon supports, e.g., foils or plates made of metals such as aluminum, zinc, or copper or plates made of layers of such metals, or paper or glass, as solutions in organic solvents, e.g. ethylene glycol monomethylether, ethylene glycol monoethylether, dioxane, dimethyl formamide or aliphatic ketones, after which the solvent is evaporated. By means of these reproduction coatings, copies can be prepared which, by development, preferably with dilute alkalis, particularly salts with alkaline action such as trisodium phosphate and disodium phosphate, can be converted into printing surfaces. Alkali-soluble resins may also be incorporated in the reproduction coatings. In general, these increase the uniformity of the film-like coating on the support and also the adherence of the image. The alkali-soluble resins may be natural resins, such as shellac and colophony, or synthetic resins such as interpolymers of styrene and maleic anhydride and, particularly, the lower phenol-formaldehyde condensation products known as novolaks.

Mixtures of various esters such as are described above, or mixtures of such esters with other light-sensitive materials, may be used.

Printing plates which have been prepared by the use of the naphthoquinone-(1,2)-diazide-(2)-sulfonic acid esters described above, in comparison with those prepared using the esters hitherto known, have greater ease of development and increased thermostability; thus the shelf life of the unexposed printing plate is increased, even under unfavorable conditions. A further advantage is to be found in the clear visibility of the colored diazo images obtained on development.

The invention will be further illustrated by reference to the following specific examples:

*Example 1*

1.5 parts by weight of the compound corresponding to Formula 1 are dissolved in 100 parts by volume of ethylene glycol monomethylether, and this solution is coated upon a mechanically roughened aluminum foil. The foil is dried in a hot air current and then further dried for about two minutes at 100° C. Thus sensitized, the foil is exposed under a master to light, e.g., for one minute to an enclosed 18-amp. carbon arc lamp at a distance of about 70 cm. For the development of the image produced on the coating, the exposed side of the foil is treated with a cotton pad soaked in a 15 percent disodium phosphate solution. The image appears in yellow on metal ground. The developed foil is rinsed with water and then wiped over with about 1 percent phosphoric acid to improve the hydrophilic properties of the supporting material in the areas that have been bared; it is then inked up with greasy ink. With the printing plate thus obtained, prints corresponding to the master can be produced in a printing machine.

For the preparation of the diazo compound corresponding to Formula 1, 24 parts by weight of 1,2-dihydroxy-anthraquinone and 27 parts by weight of naphthoquinone-(1,2)-diazide-(2)-sulfochloride-(5) are dissolved in 800 parts by volume of dioxane. While stirring, saturated sodium carbonate solution is introduced into the solution slowly, at room temperature, until the solution is weakly alkaline. For the completion of the reaction, the reaction mixture is further stirred for 30 minutes. The 2-(naphthoquinone-(1,2)-diazide-(2) - sulfonyloxy - (5))-monohydroxy-(1) - anthraquinone precipitates out as a brown substance and is digested in 1000 parts by volume of ice water acidified with dilute hydrochloric acid. The monoester is separated by suction filtration, dissolved in dioxane and reprecipitated by the addition of water to the solution. It is a light brown substance which decomposes, with slow darkening, at about 200–210° C. The compound is readily soluble in ethylene glycol monomethylether and dioxane but sparingly soluble in methanol and ethanol.

*Example 2*

1.5 parts by weight of the compound corresponding to Formula 2 are dissolved in 100 parts by volume of ethylene glycol monomethylether and the solution is coated upon a mechanically roughened aluminum foil. The foil is then dried in a hot air current and then further dried for about 2 minutes at 100° C. The sensitized foil is exposed under a master to light, e.g., for about one minute to an enclosed 18-amp. carbon arc lamp at a distance of about 70 cm. For the development of the latent image thus produced, the exposed side of the foil is treated with a cotton pad soaked in 10 percent disodium phosphate solution. The image corresponding to the master appears in yellow on metal ground. The image side of the foil is rinsed down with water, wiped down with a cotton pad soaked in about 1 percent phosphoric acid and then inked up with greasy ink. From the printing plate thus obtained prints can be made in a printing machine.

For the preparation of the diazo compound corresponding to Formula 2, 25.6 parts by weight of 1,2,3-trihydroxy-anthraquinone and 27 parts by weight of naphthoquinone-(1,2)-diazide-(2)-sulfochloride-(5) are dissolved in 1000 parts by volume of dioxane. While stirring, saturated sodium bicarbonate solution is introduced slowly into the solution at room temperature until the solution is weakly alkaline and then the reaction mixture is further stirred for 30 minutes for the completion of the reaction. The monoester formed separates out in the form of a dark brown substance. It is digested in 1000 parts by volume of ice water acidified with dilute hydrochloric acid. The reaction product is separated by suction filtration, dissolved in ethylene glycol monomethylether and reprecipitated by the addition of water. The 3-(naphthoquinone-(1,2)-diazide-(2)-sulfonyloxy-(5)) - dihydroxy - (1,2)-anthraquinone is a crystalline, brown substance which decomposes with slow darkening at about 230–240° C. It is readily soluble in ethylene glycol monomethylether and dioxane but sparingly soluble in methanol and ethanol.

By procedures analogous to those described in Examples 1 and 2 printing plates can be prepared with equal success with the compounds corresponding to Formulae 3–13 which are listed above. In the table below, the most suitable developer solution for the corresponding compound is also given. In the table Developer A is an aqueous 3 percent disodium phosphate solution, Developer B is an aqueous 1 percent trisodium phosphate solution, and Developer C is an aqueous 3 percent trisodium phosphate solution.

TABLE

| Formula No.: | Developer |
|---|---|
| 3 | B |
| 4 | C |
| 5 | B |
| 6 | B |
| 7 | A |
| 8 | C |
| 9 | B |
| 10 | B |
| 11 | B |
| 12 | A |
| 13 | A |

For the preparation of the diazo compound corresponding to Formula 3, 12.8 parts by weight of 1,4,8-trihydroxy-anthraquinone and 26.8 parts by weight of naphthoquinone-(1,2)-diazide-(2)-sulfochloride-(5) are dissolved in 600 parts by volume of dioxane. Into this solution, a saturated sodium bicarbonate solution is slowly introduced, dropwise at room temperature, with stirring, until the solution is weakly alkaline.

For the completion of the reaction, stirring is continued for two hours. The reaction mixture is then diluted with about 500 parts by volume of ice water and acidified with dilute hydrochloric acid, whereupon the 1,8-bis-(naphthoquinone-(1,2)-diazide-(2) - sulfonyloxy - (5))-monohydroxy-(4)-anthraquinone separates out in the form of a brown substance. The bis-ester is separated by suction filtration, dissolved in dioxane and reprecipitated by the addition of water to the solution. It is obtained from dioxane in the form of reddish-brown crystals which melt, with decomposition, at 280° C. The compound is readily soluble in dimethyl formamide, ethylene glycol monomethylether and dioxane but only sparingly soluble in methanol and ethanol.

For the preparation of the diazo compound corresponding to Formula 4, 12.8 parts by weight of 1,2,3-trihydroxyanthraquinone and 13.5 parts by weight of naphthoquinone-(1,2)-diazide-(2)-sulfochloride-(4) are dissolved in 600 parts by volume of dioxane. Into this solution, a saturated sodium bicarbonate solution is slowly introduced at room temperature, with stirring, until the solution is weakly alkaline. For the completion of the reaction, stirring is continued for 2 hours. The reaction mixture is then diluted with about 600 parts by volume of ice water and acidified with dilute hydrochloric acid, whereupon the 3 - (naphthoquinone-(1,2)-diazide - (2) - sulfonyloxy-(4))-dihydroxy - (1,2) - anthraquinone separates out as a dark brown substance. The monoester is separated by suction filtration, dissolved in dioxane and reprecipitated by the addition of water to the solution. It is a crystalline, brown substance which decomposes with slow darkening at 220° C. It is soluble in dimethyl formamide, ethylene glycol monomethylether and dioxane and sparingly soluble in methanol and ethanol.

For the preparation of the diazo compound corresponding to Formula 5, 12.8 parts by weight of 1,2,6-trihydroxy-anthraquinone and 27 parts by weight of naphthoquinone-(1,2)-diazide-(2)-sulfochloride-(5) are dissolved in 800 parts by volume of dioxane. Into this solution, a saturated sodium bicarbonate solution is slowly introduced, dropwise with stirring, at room temperature until the solution is weakly alkaline. For the completion of the reaction, stirring is continued for 2 hours. The reaction mixture is then diluted with about 800 parts by volume of water and acidified with dilute hydrochloric acid. The bis-ester is separated by suction filtration, washed a number of times with water, and dried. The reaction product is dissolved in dioxane and reprecipitated by the addition of petroleum ether to the solution. The 2,6-bis-(naphthoquinone-(1,2) - diazide - (2) - sulfonyloxy - (5)) - monohydroxy-(1)-anthraquinone is a yellow crystalline compound which does not melt at 320° C. It is soluble in dimethyl formamide, ethylene glycol monomethylether and dioxane and sparingly soluble in methanol and ethanol.

For the preparation of the diazo compound corresponding to Formula 6, 6.8 parts by weight of 1,2,5,8-tetrahydroxy-anthraquinone and 6.7 parts by weight of naphthoquinone-(1,2)-diazide-(2)-sulfochloride-(5) are dissolved in 500 parts by volume of dioxane to which 50 parts by volume of dimethyl formamide are added. Into this solution, a saturated sodium bicarbonate solution is slowly introduced, dropwise with stirring, at room temperature, until the solution is weakly alkaline. For the completion of the reaction, stirring is continued for 2 hours.

The reaction mixture is diluted with about 500 parts by volume of ice water and acidified with dilute hydrochloric acid. The monoester is separated by suction filtration, dissolved in dioxane and reprecipitated by the addition of water to the solution. The 2-(naphthoquinone-(1,2)-diazide-(2)-sulfonyloxy-(5)) - trihydroxy-(1,5,8)-anthraquinone is a crystalline, reddish-brown substance which melts with decomposition at 232° C. It is soluble in dimethyl formamide, ethylene glycol monomethylether and dioxane and sparingly soluble in methanol and ethanol.

For the preparation of the diazo compound corresponding to Formula 7, 6.8 parts by weight of 1,2,5,8-tetrahydroxy-anthraquinone and 13.4 parts by weight of naphthoquinone-(1,2)-diazide-(2)-sulfochloride-(5) are dissolved in 500 parts by volume of dioxane to which 50 parts by volume of dimethyl formamide are added. Into this solution saturated sodium bicarbonate solution is slowly introduced, dropwise with stirring, at room temperature, until the solution is weakly alkaline. For the completion of the reaction, stirring is continued for 2 hours. The reaction mixture is then diluted with about 500 parts by volume of ice water and acidified with dilute hydrochloric acid. The bis-ester is separated by suction filtration, dissolved in dioxane and reprecipitated by the addition of water to the solution. The 2,8-bis-(naphthoquinone - (1,2) - diazide-(2)-sulfonyloxy-(5))-dihydroxy-(1,5)-anthraquinone is a crystalline, yellowish-brown substance which at 320° C. still has not melted. It is soluble in ethylene glycol monomethylether, dimethylformamide and dioxane and sparingly soluble in methanol and ethanol.

For the preparation of the diazo compound corresponding to Formula 8, 7.6 parts by weight of 1,2,3,5,6,7-hexahydroxyanthraquinone and 6.8 parts by weight of naphthoquinone-(1,2)-diazide-(2)-sulfochloride-(5) are dissolved in 500 parts by volume of dioxane to which 50 parts by volume of dimethyl formamide are added. Into this solution saturated sodium bicarbonate solution is slowly introduced, dropwise with stirring, at room temperature, until the solution is weakly alkaline. For the completion of the reaction, stirring is continued for 2 hours. The reaction mixture is then diluted with about 500 parts by volume of ice water and acidified with dilute hydrochloric acid. The monoester is separated by suction filtration, dissolved in dioxane and reprecipitated by the addition of water to the solution. The 3-(naphthoquinone - (1,2)-diazide-(2)-sulfonyloxy-(5))-pentahydroxy-(1,2,5,6,7)-anthraquinone is a crystalline, reddish-brown compound which begins to decompose with darkening at 310° C. It is readily soluble in dimethyl formamide, ethylene glycol monomethylether and dioxane and sparingly soluble in methanol and ethanol.

For the preparation of the diazo compound corresponding to Formula 9, 14.3 parts by weight of 1,2-dihydroxy-4-nitroanthraquinone and 13.4 parts by weight of naphthoquinone-(1,2)-diazide-(2)-sulfochloride-(5) are dissolved in 500 parts by volume of dioxane. Into this solution, saturated sodium bicarbonate solution is introduced slowly, with stirring, at room temperature, until the solution is weakly alkaline. For the completion of the reaction, stirring is continued for 2 hours. The reaction mixture is then diluted with about 500 parts by volume of ice water and acidified with dilute hydrochloric acid. The monoester is separated by suction filtration and washed a number of times with water. For purification, it is dissolved in dioxane and reprecipitated by the addition of petroleum ether to the solution. The 2-(naphthoquinone-(1,2) - diazide - (2)-sulfonyloxy-(5))-monohydroxy-(1)-nitro-(4)-anthraquinone is obtained in the form of reddish-brown needles which begin to decompose, with darkening, at 205° C.

For the preparation of the diazo compound corresponding to Formula 10, 16 parts by weight of 1,4-dihydroxy-2-bromanthraquinone and 13.5 parts by weight of naphthoquinone-(1,2)-diazide-(2)-sulfochloride-(5) are dissolved in 1000 parts by volume of dioxane. Into this solution, saturated sodium bicarbonate solution is slowly introduced, dropwise with stirring, at room temperature, until the solution is weakly alkaline. For the completion of the reaction, stirring is continued for 2 hours. The reaction mixture is then diluted with about 1000 parts by volume of ice water and acidified with dilute hydrochloric acid. The monoester is separated by suction filtration and washed a number of times with water. After drying, the 1-(naphthoquinone - (1,2)-diazide-(2)-sulfonyloxy-(5))-monohydroxy-(4)-bromo-(2)-anthraquinone is dissolved in dioxane and reprecipitated by the addition of petroleum ether. The monoester is then obtained in the form of reddish-brown needles which melt, with decomposition, at 236° C. It is readily soluble in dimethyl formamide, dioxane, and ethylene glycol monomethylether and sparingly soluble in methanol and ethanol.

For the preparation of the diazo compound corresponding to Formula 11, 15.5 parts by weight of 1,4-dihydroxy-2,3-dichloranthraquinone and 13.4 parts by weight of naphthoquinone - (1,2) - diazide - (2) - sulfochloride-(5) are dissolved in 800 parts by volume of dioxane. Into this solution, saturated sodium bicarbonate solution is slowly introduced with stirring, at room temperature, until the solution is weakly alkaline. For the completion of the reaction, stirring is continued for two hours. The reaction mixture is then diluted with about 800 parts by volume of ice water and acidified with dilute hydrochloric acid. The monoester is separated by suction filtration, washed a number of times with water and dried. For purification, it is dissolved in dioxane and reprecipitated by the addition of petroleum ether. The 1-(naphthoquinone - (1,2) - diazide - (2) - sulfonyloxy - (5))-monohydroxy-(4)-dichloro-(2,3)-anthraquinone is a crystalline, reddish-brown substance which decomposes, with blackening, at 260° C.

For the preparation of the diazo compound corresponding to Formula 12, 12.8 parts by weight of 1,2,3-trihydroxy-anthraquinone and 13.5 parts by weight of naphthoquinone - (1,2) - diazide - (1) - sulfochloride - (4) are dissolved in 600 parts by volume of dioxane. Into this solution, saturated sodium bicarbonate solution is slowly introduced, with stirring, at room temperature, until the solution is weakly alkaline and the reaction mixture is further stirred for 2 hours to complete the reaction. The solution is then diluted with about 600 parts by volume of ice water and acidified with dilute hydrochloric acid, whereupon the 3-(naphthoquinone-(1,2)-diazide - (1) - sulfonyloxy - (4)) - dihydroxy - (1,2)-anthraquinone precipitates out as a dark brown substance. The monoester is separated by suction filtration, dissolved in dioxane and reprecipitated by the addition of water to the solution. It is a crystalline brown substance which decomposes, with slow darkening, at 225° C. It is soluble in dimethyl formamide, ethylene glycol monomethylether and dioxane and sparingly soluble in ethanol and methanol.

For the preparation of the diazo compound corresponding to Formula 13, 12.8 parts by weight of 1,2,3-trihydroxy-anthraquinone and 13.5 parts by weight of naphthoquinone - (1,2) - diazide - (1) - sulfochloride-(6) are dissolved in 600 parts by volume of dioxane. Into this solution, saturated sodium bicarbonate solution is slowly introduced, with stirring, at room temperature, until the solution is weakly alkaline. For the completion of the reaction, stirring is continued for 2 hours. The reaction mixture is then diluted with about 600 parts by volume of ice water and acidified with dilute hydrochloric acid. The monoester is separated by suction filtration, dissolved in dioxane and reprecipitated by the addition of water to the solution. The 3-(naphthoquinone-(1,2) - diazide - (1) - sulfonyloxy - (6)) - dihydroxy-(1,2)-anthroquinone is a crystalline, light brown substance which decomposes with slow darkening at 220° C.

*Example 3*

An anodically oxidized aluminum foil is coated with a solution of 1.5 parts by weight of the compound corresponding to Formula 2 in 100 parts by volume of dimethyl formamide and dried in a hot air current. The light sensitive coating formed is exposed to light under a transparent master, developed with an aqueous 3 percent trisodium phosphate solution using a cotton pad, treated with water, then with 1 percent phosphoric acid, and inked up with greasy ink. The printing plate obtained, which corresponds to the master, may be used for the production of copies in a printing machine.

*Example 4*

A paper foil pretreated for the preparation of printing plates, e.g., a paper foil prepared in accordance with the details given in U.S. Patent No. 2,681,617, is coated with a 1.2 percent solution of the compound corresponding to Formula 2 in methylethylketone and the coated foil is dried in a hot air current. After the foil thus sensitized has been exposed to light under a master, the parts of the coating struck by light, which contain the light-decomposition product of the diazo compound, are dissolved away with an approximately 2 percent solution of trisodium phosphate. The foil thus developed, after being inked up with greasy ink, can be used for printing.

*Example 5*

1 part by weight of the compound corresponding to Formula 4 and 0.75 part by weight of an alkali-soluble phenol-formaldehyde novolak, e.g., a phenol resin with a melting point of 108–118° C. and an acid number of 0, are dissolved in 100 parts by volume of dimethyl formamide and the solution is coated upon a mechanically roughened aluminum foil. The foil is then dried in a hot air current and then further dried for about two minutes at 100° C. The sensitized foil is exposed to light under a transparent master and the latent image formed is treated with a cotton pad soaked in 1 percent trisodium phosphate solution. The image corresponding to the master appears in yellow on metal ground. The image side of the foil is rinsed down with water, wiped over with a cotton pad soaked in about 1 percent phosphoric acid and then inked up with greasy ink.

The printing plate thus obtained can be used for the production of copies on a printing press.

*Example 6*

Two parts by weight of 3-(naphthoquinone-(1,2)-diazide - (2) - sulfonyl - hydroxy - (4)) - dihydroxy - (1,2)-anthraquinone corresponding to Formula 4 and 6 parts by weight of an m-cresol-formaldehyde resin novolak having a softening range of 108–118° C. and a medium light colour are dissolved in 100 parts by volume of ethyleneglycol monomethylether and 0.3 part by weight of castor oil and 0.5 part by weight of Methyl Violet BB are added. After filtration, this solution is coated onto a polished zinc plate and dried by means of hot air. For the preparation of a block, the layer side of the zinc plate is exposed under a diapositive and the exposed layer side is then treated with a cotton pad soaked in a 2.5 percent (by volume) trisodium phosphate solution containing approximately 10 to 15 percent (by volume) of ethyleneglycol monomethylether. The areas of the layer which were struck by light during exposure are thus removed from the surface of the zinc plate and an image corresponding to the master is formed on the metallic support. After rinsing with water, the plate is placed, coated side downwards on an earthenware trough containing rotating finned wheels which project dilute (7–8%) nitric acid against the plate by centrifugal action. Etching is performed either by the usual process in several steps or according to the 1-step-process. Without heating the zinc plate before etching, a block is thus obtained which is suitable for book printing.

*Example 7*

Two parts by weight of 3-(naphthoquinone-(1,2)-diazide - (2) - sulfonyl - hydroxy - (5)) - dihydroxy - (1,2)-anthraquinone corresponding to Formula 2 and 6 parts by weight of an m-cresol-formaldehyde resin novolak of the qualities stated in Example 6 are dissolved in 100 parts by volume of ethyleneglycol monomethylether. After adding 0.3 part by weight of corn oil and 0.5 part by weight of rosaniline hydrochloride, the solution is filtered and then coated onto a polished copper plate. After exposure under a photographic negative, the layer side struck by light is treated with a cotton pad soaked in an approximately 2.5 percent trisodium phosphate solution containing 10 to 15 percent (by volume) of ethyleneglycol monomethylether. By this treatment, those parts of the layer which were struck by light during exposure are removed from the metallic support. At a temperature of 20–22° C., the copper plate thus bared is etched with an iron-trichloride solution of 40° Bé. Alternatively, the light sensitive solution may be used for directly coating a rotating copper cylinder, advantageously by means of a spray gun.

It will be obvious to those skilled in the art that many modifications may be made within the scope of the present invention without departing from the spirit thereof, and the invention includes all such modifications.

What is claimed is:

1. An ester of a naphthoquinone-(1,2)-diazide sulfonic acid with an anthraquinone substituted by at least two hydroxyl groups, the ester containing at least one free hydroxyl group in a neighboring position to a carbon atom which, in the anthraquinone nucleus, is common to two rings.

2. An ester according to claim 1 in which the anthraquinone is further substituted by a radical selected from the group consisting of nitro, halogen, alkyl, and alkoxy.

3. A compound having the formula

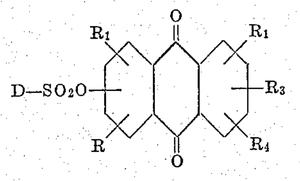

in which D is a naphthoquinone-(1,2)diazide radical, and R, $R_1$, $R_2$, $R_3$, and $R_4$ are selected from the group consisting of hydrogen, hydroxyl, nitro, halogen, alkyl, alkoxy and naphthoquinone-(1,2)-diazide sulfonyloxy groups, at least one being hydroxyl in a neighboring position to a carbon atom which, in the anthraquinone nucleus, is common to two rings and no more than three being sulfonyloxy groups.

4. A compound having the formula

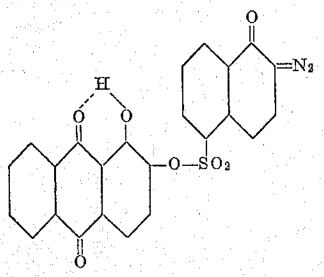

5. A compound having the formula

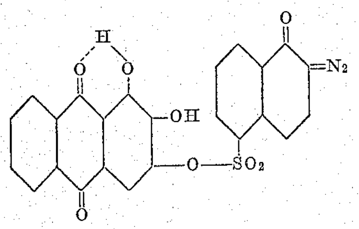

6. A compound having the formula

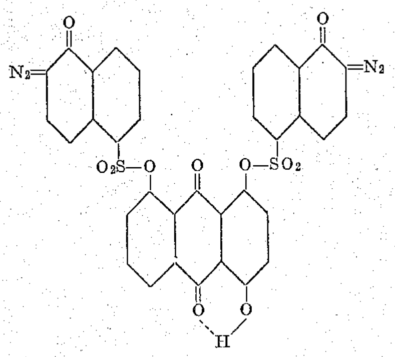

7. A compound having the formula

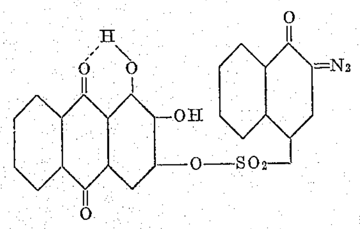

8. A compound having the formula

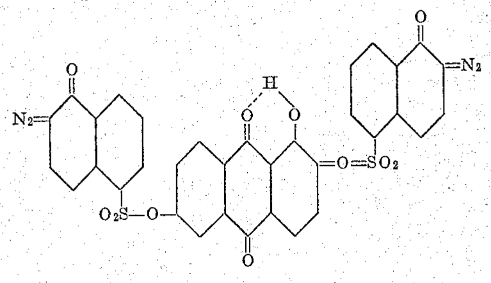

9. A compound having the formula

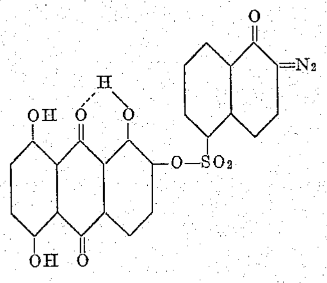

10. A compound having the formula

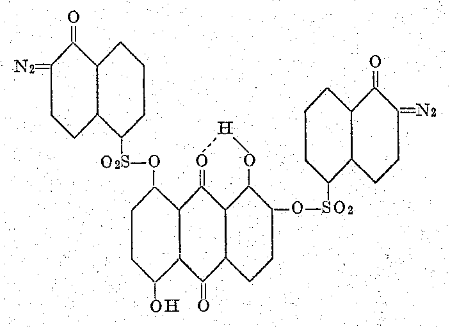

11. A compound having the formula

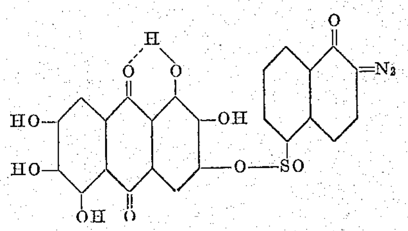

12. A compound having the formula

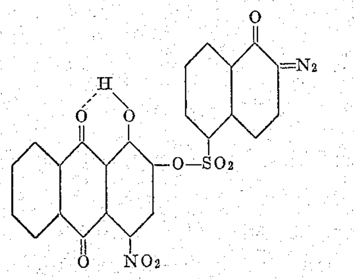

13. A compound having the formula

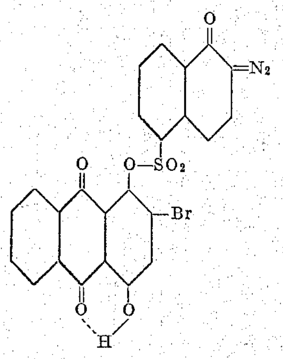

14. A compound having the formula

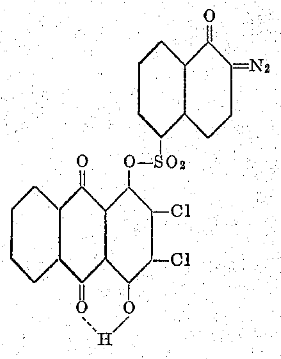

15. A compound having the formula

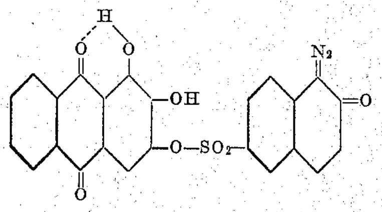

16. A presensitized printing plate comprising a base material having a coating thereon, the coating comprising an ester of a naphthoquinone-(1,2)-diazide sulfonic acid with an anthraquinone substituted by at least two hydroxyl groups, the ester containing at least one free hydroxyl group in a neighboring position to a carbon atom which, in the anthraquinone nucleus, is common to two rings.

17. A presensitized printing plate according to claim 16 in which the anthraquinone is further substituted by a radical selected from the group consisting of nitro, halogen, alkyl, and alkoxy.

18. A presensitized printing plate according to claim 16 in which the coating includes an alkali-soluble resin.

19. A presensitized printing plate comprising a base material having a coating thereon, the coating comprising a compound having the formula

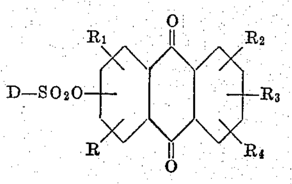

in which D is a naphthoquinone-(1,2)-diazide radical, and R, $R_1$, $R_2$, $R_3$, and $R_4$ are selected from the group consisting of hydrogen, hydroxyl, nitro, halogen, alkyl, alkoxy and naphthoquinone-(1,2)-diazide sulfonyloxy groups, at least one being hydroxyl in a neighboring position to a carbon atom which, in the anthraquinone nucleus, is common to two rings and no more than three being sulfonyloxy groups.

20. A presensitized printing plate comprising a base material having a coating thereon, the coating comprising a compound having the formula

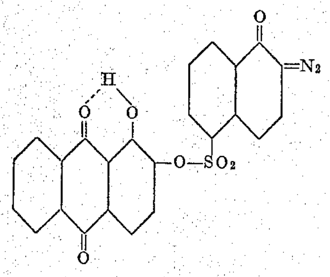

21. A presensitized printing plate comprising a base material having a coating thereon, the coating comprising a compound having the formula

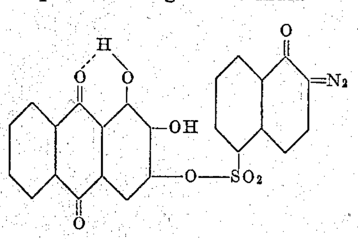

22. A presensitized printing plate comprising a base material having a coating thereon, the coating comprising a compound having the formula

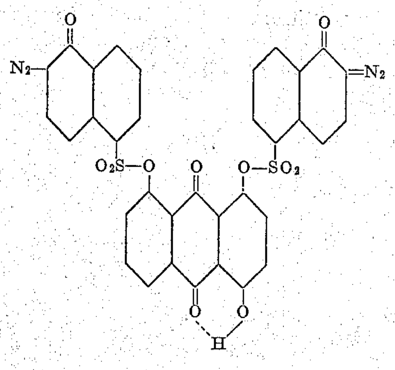

23. A presensitized printing plate comprising a base material having a coating thereon, the coating comprising a compound having the formula

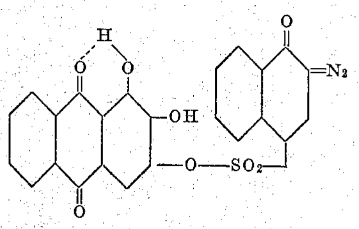

24. A presensitized printing plate comprising a base material having a coating thereon, the coating comprising a compound having the formula

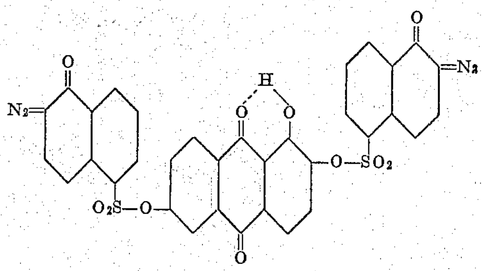

25. A presensitized printing plate comprising a base material having a coating thereon, the coating comprising a compound having the formula

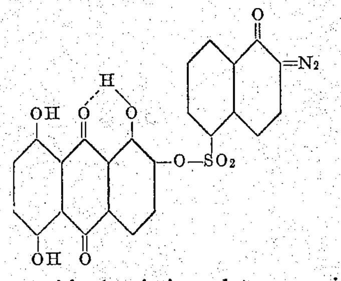

26. A presensitized printing plate comprising a base material having a coating thereon, the coating comprising a compound having the formula

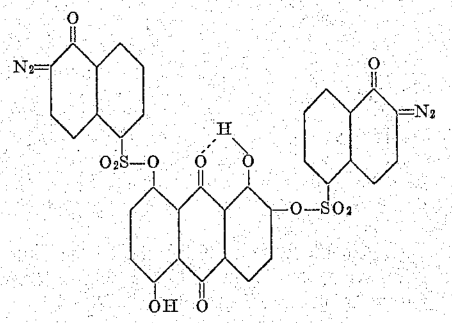

27. A presensitized printing plate comprising a base material having a coating thereon, the coating comprising a compound having the formula

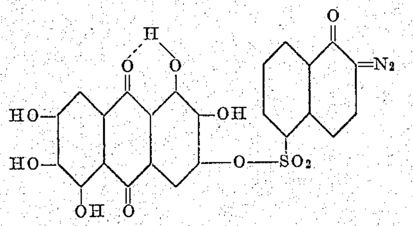

28. A presensitized printing plate comprising a base material having a coating thereon, the coating comprising a compound having the formula

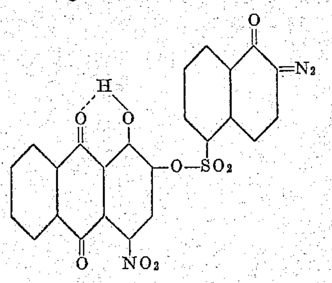

29. A presensitized printing plate comprising a base material having a coating thereon, the coating comprising a compound having the formula

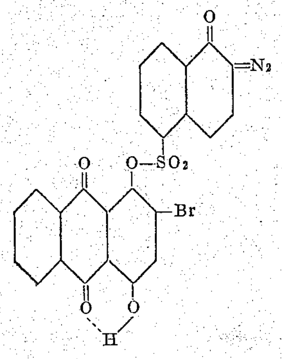

30. A presensitized printing plate comprising a base material having a coating thereon, the coating comprising a compound having the formula

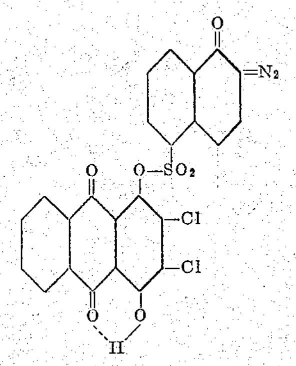

31. A presensitized printing plate comprising a base material having a coating thereon, the coating comprising a compound having the formula

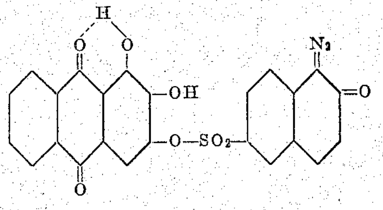

32. A process for making a printing plate which comprises exposing a coated base material to light under a master, the coating comprising an ester of a naphthoquinone-(1,2)-diazide sulfonic acid with an anthraquinone substituted by at least two hydroxyl groups, the ester containing at least one free hydroxyl group in a neighboring position to a carbon atom which, in the anthraquinone nucleus, is common to two rings, and treating the exposed coating with a dilute alkali developing solution.

33. A process according to claim 32 in which the anthraquinone is further substituted by a radical selected from the group consisting of nitro, halogen, alkyl, and alkoxy.

34. A process according to claim 32 in which the coating includes an alkali-soluble resin.

35. A process for making a printing plate which comprises exposing a coated base material to light under a master, the coating comprising a compound having the formula

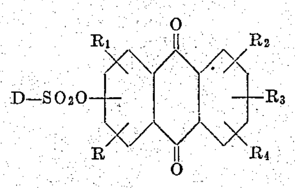

in which D is a naphthoquinone-(1,2)-diazide radical, and R, $R_1$, $R_2$, $R_3$, and $R_4$ are selected from the group consisting of hydrogen, hydroxyl, nitro, halogen, alkyl, alkoxy and naphthoquinone-(1,2)-diazide sulfonyloxy groups, at least one being hydroxyl in a neighboring position to a carbon atom which, in the anthraquinone nucleus, is common to two rings and no more than three being sulfonyloxy groups, and treating the exposed coating with a dilute alkali developing solution.

36. A proces for making a printing plate which comprises exposing a coated base material to light under a master, the coating comprising a compound having the formula

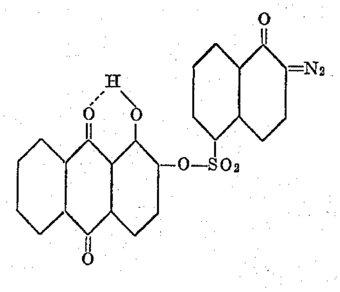

and treating the exposed coating with a dilute alkali developing solution.

37. A process for making a printing plate which comprises exposing a coated base material to light under a master, the coating comprising a compound having the formula

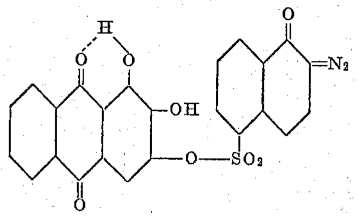

and treating the exposed coating with a dilute alkali developing solution.

38. A process for making a printing plate which comprises exposing a coated base material to light under a master, the coating comprising a compound having the formula

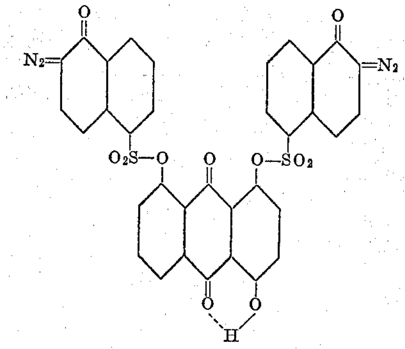

and treating the exposed coating with a dilute alkali developing solution.

39. A process for making a printing plate which comprises exposing a coated base material to light under a master, the coating comprising a compound having the formula

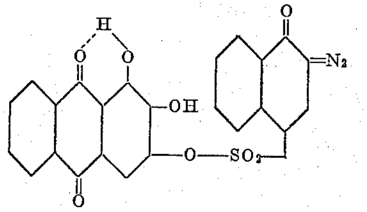

and treating the exposed coating with a dilute alkali developing solution.

40. A process for making a printing plate which comprises exposing a coated base material to light under a master, the coating comprising a compound having the formula

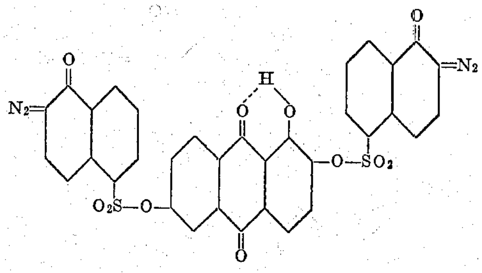

and treating the exposed coating with a dilute alkali developing solution.

41. A process for making a printing plate which comprises exposing a coated base material to light under a master, the coating comprising a compound having the formula

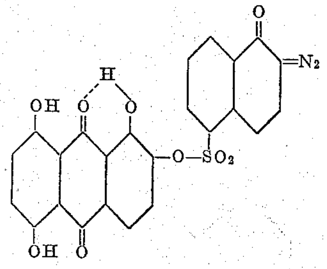

and treating the exposed coating with a dilute alkali developing solution.

42. A process for making a printing plate which comprises exposing a coated base material to light under a master, the coating comprising a compound having the formula

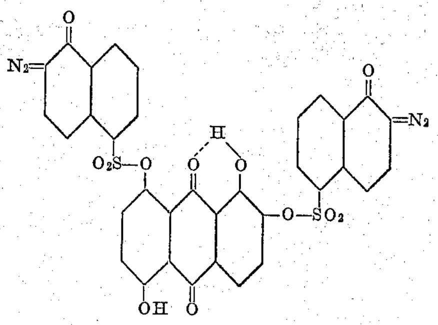

and treating the exposed coating with a dilute alkali developing solution.

43. A process for making a printing plate which comprises exposing a coated base material to light under a master, the coating comprising a compound having the formula

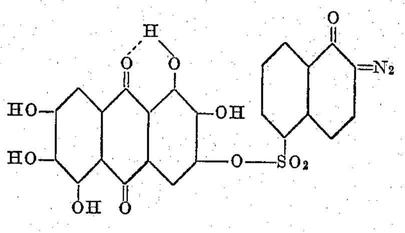

and treating the exposed coating with a dilute alkali developing solution.

44. A process for making a printing plate which comprises exposing a coated base material to light under a master, the coating comprising a compound having the formula

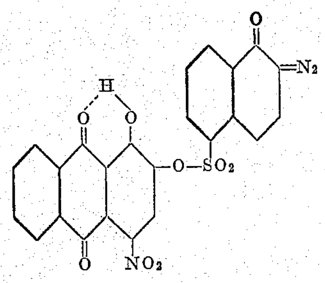

and treating the exposed coating with a dilute alkali developing solution.

45. A process for making a printing plate which comprises exposing a coated base material to light under a master, the coating comprising a compound having the formula

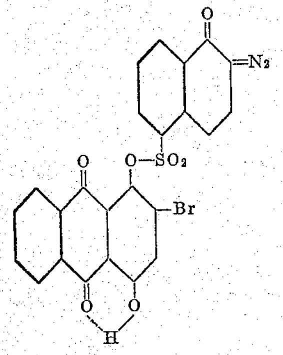

and treating the exposed coating with a dilute alkali developing solution.

46. A process for making a printing plate which comprises exposing a coated base material to light under a master, the coating comprising a compound having the formula

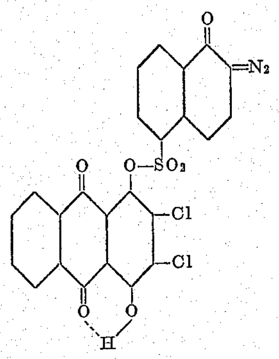

and treating the exposed coating with a dilute alkali developing solution.

47. A process for making a printing plate which comprises exposing a coated base material to light under a master, the coating comprising a compound having the formula

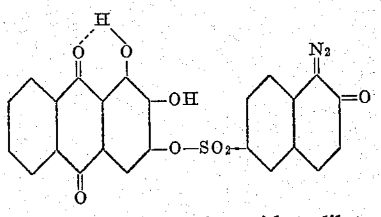

and treating the exposed coating with a dilute alkali developing solution.

References Cited in the file of this patent

UNITED STATES PATENTS

| | | |
|---|---|---|
| 2,702,243 | Schmidt et al. | Feb. 15, 1955 |

FOREIGN PATENTS

| | | |
|---|---|---|
| 706,028 | Great Britain | Mar. 24, 1954 |
| 737,379 | Great Britain | Sept. 28, 1955 |
| 739,654 | Great Britain | Nov. 2, 1955 |